No. 781,786. PATENTED FEB. 7, 1905.
C. W. PHILLIPS.
TOOL HOLDER.
APPLICATION FILED MAY 9, 1904.
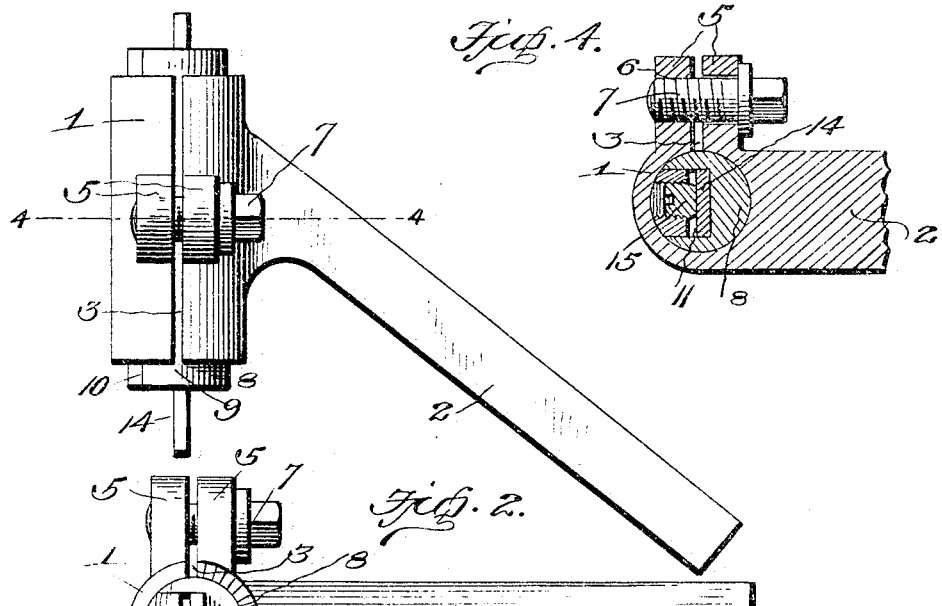
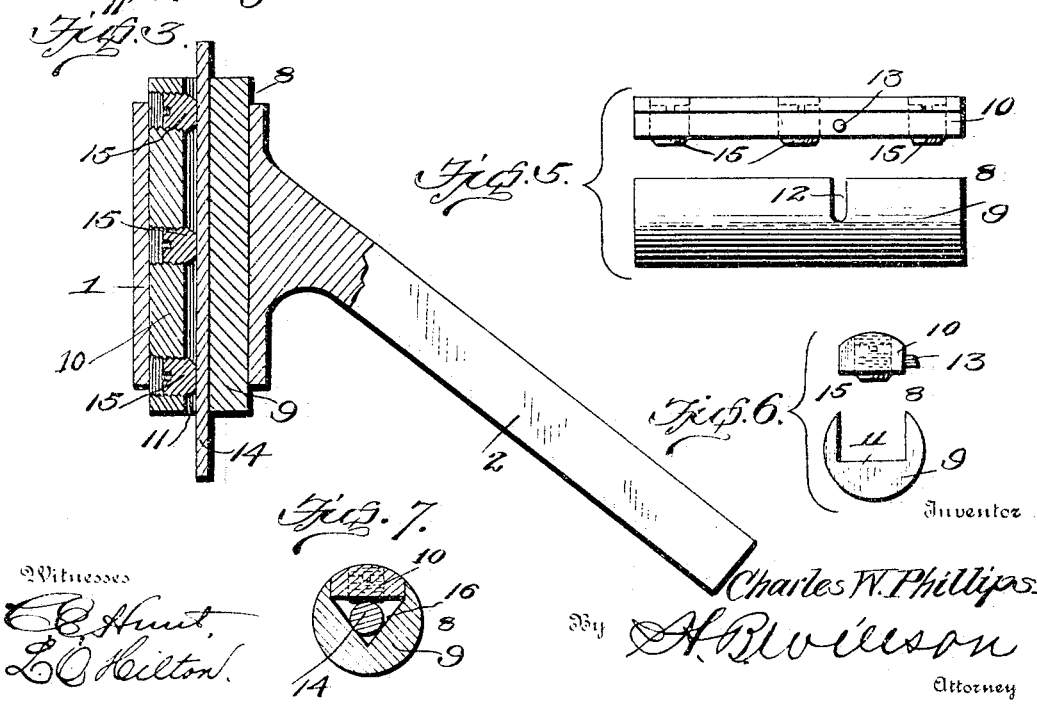

No. 781,786. Patented February 7, 1905.

UNITED STATES PATENT OFFICE.

CHARLES W. PHILLIPS, OF MILWAUKEE, WISCONSIN, ASSIGNOR OF ONE-HALF TO EUGENE F. JEWELL, OF MILWAUKEE, WISCONSIN.

TOOL-HOLDER.

SPECIFICATION forming part of Letters Patent No. 781,786, dated February 7, 1905.

Application filed May 9, 1904. Serial No. 207,133.

*To all whom it may concern:*

Be it known that I, CHARLES W. PHILLIPS, a citizen of the United States, residing at Milwaukee, in the county of Milwaukee and State of Wisconsin, have invented certain new and useful Improvements in Tool-Holders; and I do declare the following to be a full, clear, and exact description of the invention, such as will enable others skilled in the art to which it appertains to make and use the same.

My invention relates to improvements in tool-holders for use in the usual tool-posts of lathes or similar machines.

The object of my invention is to provide a simple, durable, and efficient device of this character by means of which machine-tools of various kinds and sizes may be securely held and at the same time permitted to be readily turned or adjusted to either side and at any desired angle.

With this and other objects in view the invention consists of certain novel features of construction, combination, and arrangement of parts, as will be more fully described, and particularly pointed out in the appended claims.

In the accompanying drawings, Figure 1 is a top plan view of my improved tool-holder. Fig. 2 is an end elevation of the same. Fig. 3 is a horizontal section taken on the line 3 3 of Fig. 2. Fig. 4 is a vertical transverse section taken on the line 4 4 of Fig. 1. Fig. 5 is a side elevation of the chuck removed from the chuck-casing, its jaws being shown separated. Fig. 6 is an end elevation of the parts shown in Fig. 5. Fig. 7 is a detail transverse sectional view through a modified form of chuck.

Referring to the drawings by numerals, 1 denotes a cylindrical chuck head or casing formed with an angularly-projecting shank 2 at one side and a longitudinal slit 3 in its top. Said casing is formed with a cylindrical bore 4, and upon its top at each side of said slit is formed an apertured lug 5. One of said lugs is screw-threaded, as at 6, to receive a screw 7, which also passes through the other of said lugs to clamp said casing upon a chuck 8. Said chuck is of cylindrical form and of slightly less diameter than the diameter of the bore 4 and comprises two jaws 9 and 10. The jaw 9, as shown in the first six figures of the drawings, is formed with a rectangular recess 11, into which the jaw 10 telescopes, and in order to guide said jaw 10 a slot 12 is formed in one side of the jaw 9 and is adapted to receive a pin 13, projecting from the jaw 10. The machine-tool 14, of any suitable form, which is to be held by the device, is clamped in said recess 11 by the jaw 10, and in order to permit tools of various sizes to be thus clamped the jaw 10 is provided with a series of set-screws 15, which may be adjusted into and out of threaded apertures in said jaw to vary the thickness of the latter, as will be readily understood.

Instead of forming the jaw 9 with a recess having a flat bottom to accommodate tools which are rectangular in cross-section I may form the same with a recess having a V-shaped bottom 16, as shown in Fig. 7, to permit tools which are circular in cross-section to be clamped.

The operation of the device will be readily seen upon reference to the drawings. The tool to be clamped is placed in the recess 11 of the jaw 9 beneath the jaw 10, and the set-screws 15 of the latter are then adjusted so that the outer face of said jaw 10 will project slightly beyond the curvature of the jaw 9. The jaws are then placed in the bore 4 of the casing 1, and the screw 7 is then operated to simultaneously clamp said jaws within the casing and said jaws upon the tool. The shank 2 is clamped in the usual tool-post, as will be readily understood. It will be seen that when the screw 7 is loosened the jaws may be readily turned in the bore of the casing to adjust the tool at any desired angle and that said jaws may also be moved or adjusted longitudinally. If desired, one end of the casing 1 may be provided with a suitable scale with which an indicator-arrow upon the adjacent end of the jaw 9 coacts in order to indicate the angle at which the tool is adjusted.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. In a tool-holder, the combination of a split clamping-casing, having a cylindrical bore, a cylindrical tool-chuck comprising telescoping jaws adapted to receive a tool between them, screws in one of said jaws to limit its movement into the other of said jaws, and means for clamping said chuck in said casing, and a tool between said jaws, substantially as described.

2. In a tool-holder, the combination of a split clamping-casing having a cylindrical bore, a cylindrical tool-chuck comprising telescoping jaws adapted to receive a tool between them, screws in one of said jaws to limit its movement into the other of said jaws, a pin-and-slot connection between said jaws to guide them in their telescoping movement, and a screw for clamping said chuck in said casing and the jaws of the chuck upon a tool, substantially as described.

In testimony whereof I have hereunto set my hand in presence of two subscribing witnesses.

CHARLES W. PHILLIPS.

Witnesses:
EUGENE JEWELL,
JOE H. LIESENFELD.